United States Patent
Seo (10) Patent No.: US 12,237,944 B2
(45) Date of Patent: Feb. 25, 2025

(54) COMMUNICATION NETWORK SYSTEM AND METHOD OF OPERATING SAME

(71) Applicants: HYUNDAI MOTOR COMPANY, Seoul (KR); KIA CORPORATION, Seoul (KR)

(72) Inventor: Kang Woon Seo, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 147 days.

(21) Appl. No.: 17/984,809

(22) Filed: Nov. 10, 2022

(65) Prior Publication Data

US 2023/0388147 A1 Nov. 30, 2023

(30) Foreign Application Priority Data

May 26, 2022 (KR) .................. 10-2022-0064826

(51) Int. Cl.
*G06F 15/173* (2006.01)
*H04L 12/40* (2006.01)
*H04L 69/08* (2022.01)

(52) U.S. Cl.
CPC .............. *H04L 12/40* (2013.01); *H04L 69/08* (2013.01); *H04L 2012/40215* (2013.01)

(58) Field of Classification Search
CPC ................. H04L 12/40; H04L 69/08; H04L 2012/40215
USPC ........................................... 709/224
See application file for complete search history.

(56) References Cited

U.S. PATENT DOCUMENTS

2021/0185070 A1* 6/2021 Jeon ................ H04L 12/66
2021/0266244 A1* 8/2021 Haga ................ G06F 21/554

* cited by examiner

*Primary Examiner* — Nicholas P Celani
*Assistant Examiner* — Karina J Garcia-Ching
(74) *Attorney, Agent, or Firm* — Lempia Summerfield Katz LLC (57) ABSTRACT

A communication network system and a method of operating the same are disclosed. The communication network system includes a controller area network (CAN) controller that generates a CAN message, a gateway that receives the CAN message and generates a conversion message for Ethernet communication based on that preset conversion determination data is included in the CAN message, and an Ethernet controller that receives the conversion message.

14 Claims, 12 Drawing Sheets

COMMUNICATION NETWORK SYSTEM AND METHOD OF OPERATING SAME

CROSS-REFERENCE TO RELATED APPLICATION

This application claims the benefit of priority to Korean Patent Application No. 10-2022-0064826, filed in the Korean Intellectual Property Office on May 26, 2022, the entire contents of which are incorporated herein by reference.

TECHNICAL FIELD

The present disclosure relates to a communication network system and a method of operating the same, and more particularly, to a technology capable of reducing a data routing delay.

BACKGROUND

In-vehicle communication generally uses a controller area network (CAN) communication scheme, but in recent years, there is a trend to change in-vehicle communication to Ethernet communication. A scalable service-oriented middleware over IP (SOME/IP) communication scheme is used to support data communication based on Ethernet.

The information location of the payload of the CAN message is determined according to a pre-specified bit, whereas the payload of the SOME/IP message is made in a service manner. Therefore, in order for the Ethernet controller to perform a specific service based on the CAN message generated by a CAN controller, the payload of the CAN message must be modified.

Thus, an additional algorithm for data conversion of the payload may be required to convert the CAN message to the form of the SOME/IP message, and routing may be delayed due to the data conversion process.

SUMMARY

The present disclosure has been made to solve the above-mentioned problems occurring in the prior art while advantages achieved by the prior art are maintained.

Aspects of the present disclosure provide a communication network system capable of reducing a data routing speed and a method of operating the same.

Another aspect of the present disclosure provides a communication network system capable of removing a processing procedure for data conversion in a data routing process. Another aspect of the present disclosure provides a method of operating the same.

The technical problems to be solved by the present disclosure are not limited to the aforementioned problems. Any other technical problems not mentioned herein should be clearly understood from the following description by those ordinarily skilled in the art to which the present disclosure pertains.

According to an aspect of the present disclosure, a communication network system includes a CAN controller that generates a CAN message, a gateway that receives the CAN message, and generates a conversion message for Ethernet communication based on that preset conversion determination data is included in the CAN message, and an Ethernet controller that receives the conversion message.

According to an embodiment, the communication network system may further include a database that stores the conversion determination data for a message required to be transmitted to the Ethernet controller.

According to an embodiment, the gateway may search whether an identifier (ID) of the CAN message matches the conversion determination data stored in the database.

According to an embodiment, the gateway may generate the conversion message based on a SOME/IP communication protocol standard.

According to an embodiment, the gateway may generate the conversion message including a header including a preset conversion factor and an ID of the CAN message.

According to an embodiment, the gateway may include the conversion factor and the ID of the CAN message in the header by replacing Service-ID and Method-ID of the SOME/IP communication protocol.

According to an embodiment, the gateway may set a length of the conversion factor to a length obtained by subtracting a length of the ID of the CAN message from a length of the header of the SOME/IP communication protocol.

According to an embodiment, the gateway may replace a payload of the conversion message with a payload of the CAN message.

According to an embodiment, the Ethernet controller may check a conversion factor indicating that the conversion message is converted from the CAN message and, based on the conversion factor included in the conversion message, operate a service model capable of performing a specific service based on a payload of the CAN message.

According to an embodiment, the communication network system may further include a switch device that receives the conversion message from the gateway corresponding to a plurality of Ethernet controllers and that sets a transmission route of the conversion message according to a destination of the conversion message.

According to an embodiment, the switch device may classify a plurality of conversion messages into two or more preset groups and may set the transmission route of the conversion message based on different destination addresses assigned to the converted message groups.

According to another aspect of the present disclosure, a method of operating a communication network system includes receiving a CAN message from a CAN controller, generating a conversion message for Ethernet communication based on that preset conversion determination data is included in the CAN message, and transmitting the conversion message to an Ethernet controller.

According to an embodiment, the generating of the conversion message may include determining whether an ID of the CAN message corresponds to the preset conversion determination data.

According to an embodiment, the generating of the conversion message may include generating the conversion message based on a SOME/IP communication protocol standard.

According to an embodiment, the generating of the conversion message may include generating a header including a preset conversion factor and an ID of the CAN message.

According to an embodiment, the generating of the conversion message may include allowing the conversion factor and the ID of the CAN message to be included in the header by replacing Service-ID and Method-ID of the SOME/IP communication protocol.

According to an embodiment, the generating of the conversion message may include using the conversion factor set to a length obtained by subtracting an ID length of the CAN message from a header length of the SOME/IP communication protocol.

According to an embodiment, the generating of the conversion message may include replacing a payload of the conversion message with a payload of the CAN message.

According to an embodiment, the method may further include performing, by the Ethernet controller, a specific service requested by the CAN message based on the conversion message.

According to an embodiment, the performing of the specific service may include checking, by the Ethernet controller, a conversion factor indicating that the conversion message is converted from the CAN message. The performing of the specific service may also include operating a service model capable of performing a specific service based on a payload of the CAN message based on the conversion factor included in the conversion message.

BRIEF DESCRIPTION OF THE DRAWINGS

The above and other objects, features, and advantages of the present disclosure will be more apparent from the following detailed description taken in conjunction with the accompanying drawings.

DETAILED DESCRIPTION

Hereinafter, some embodiments of the present disclosure are described in detail with reference to the drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function has been omitted where it would interfere with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. Further, terms such as those defined in commonly used dictionaries should be interpreted as having a meaning that is consistent with their meaning in the context of the relevant art and should not be interpreted in an idealized or overly formal sense unless expressly so defined herein.

Hereinafter, embodiments of the present disclosure are described in detail with reference to FIGS. 1-12. When a part, unit, component, module, controller, or the like of the present disclosure is described as having a purpose or performing an operation, function, or the like, the part, unit, component, module, controller, or the like should be considered herein as being "configured to" meet that purpose or to perform that operation or function.

Figure 1:
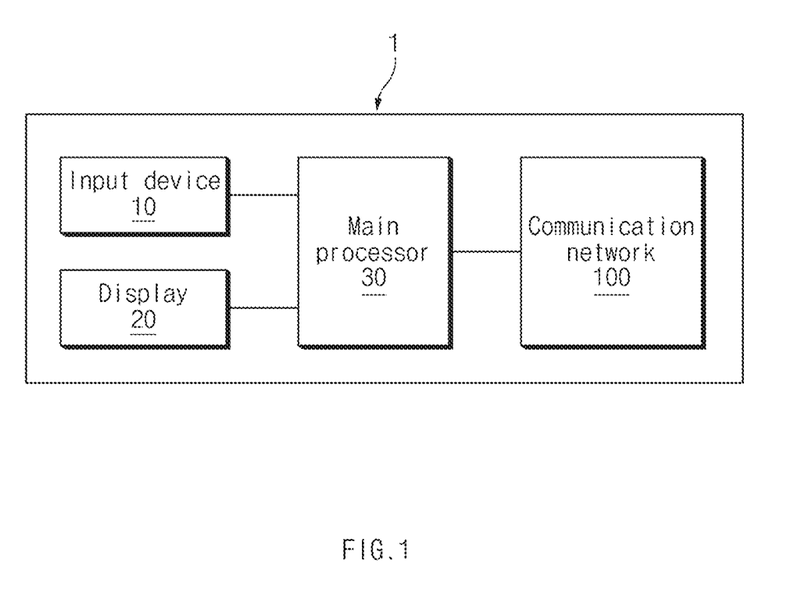
FIG. 1 is a diagram illustrating the configuration of a vehicle to which a communication network system according to an embodiment of the present disclosure is applied.

FIG. 1 is a diagram illustrating the configuration of a vehicle to which a communication network system according to an embodiment of the present disclosure is applied.

Referring to FIG. 1, a vehicle 1 may include an input device 10, a display 20, a main processor 30, and a communication network 100.

The vehicle 1 may include a body having an interior and an exterior, and a chassis in which mechanical devices necessary for driving are installed as remaining parts except for the body. The exterior of the body may include a front panel, a bonnet, a roof panel, a rear panel, a trunk, front and rear, left and right doors, and window glass. The vehicle 1 may further include a side mirror providing a driver with a view of the rear of the vehicle. The interior of the body may include a seat on which the occupant sits, a dashboard, an instrument panel (i.e., cluster) arranged on the dashboard and displaying driving information, status information, and the like, a heating wire for supplying heat to the seat, and a ventilation device for circulating air in the seat. The interior of the body may further include a head unit provided on the center fascia. The head unit may be connected to various loads that perform an audio function, a radio function, an air conditioning function and a seat heating function, a ventilation function, a navigation function, a digital multimedia broadcasting (DMB) function, and a telephone function, receive an operation command to perform each function, and control the operation of each function based on the received operation command or transmit the operation command to the corresponding load.

The vehicle 1 may further include the input device 10 for receiving an operation command of at least one among a plurality of functions that can be performed in the vehicle. The vehicle 1 may further include the display 20 that displays information about the function being performed, information inputted by the user, and communication error information.

The input device 10 may include at least one physical button, such as an on/off button for operating various functions, a button for changing setting values of various functions, and the like, provided on the head unit or the center fascia. The input device 10 may be implemented as a jog dial (not shown) or a touch pad for inputting a command for moving a cursor displayed on the display and a selection command. The input device 10, which receives a user input, may receive input information corresponding to a user input or a command for transmitting/receiving a message.

The display 20 may display operation information of an electronic device and information on transmission/reception of messages between electronic devices and may display error information of an electronic device or communication. The display may be implemented as a flat panel display device such as a liquid crystal display (LCD), an organic light emitting diode display (OLED), and the like, and be implemented in the form of a touch display by combining a touch panel with a flat display device.

The vehicle 1 may further include a vehicle terminal (AVN) provided in the interior. When at least one function is selected from a navigation function, a DMB function, an audio function, a video function, a phone function and a radio function, a vehicle terminal may perform at least one selected function and display operation information of the function being performed.

The vehicle 1 may include an electronic control unit (ECU) for controlling electronic devices such as a seat position adjustment device, a seat heating and ventilation device, a window glass opening/closing device, a door opening/closing and locking device, a side mirror angle adjusting device, a cluster, a head unit, a display, a vehicle terminal, and the like.

The chassis of the vehicle 1 may further include a power generating device, a power transmitting device, a driving device, a steering device, a braking device, a suspension device, a transmission device, a fuel device, front and rear, left and right wheels, and the like.

The vehicle 1 may include an ECU for controlling the driving of electronic devices such as a power generating device, a power transmission device, a driving device, a steering device, a braking device, a suspension device, a transmission device, a fuel device, various safety devices, and various sensors.

The vehicle 1 may include the communication network 100 for performing communication between various electronic devices therein. The communication network 100 may be connected to a plurality of controllers for controlling various loads of the vehicle by wire, respectively, and may also be connected to the main processor 30.

The communication network 100 for connecting the electronic control devices will be described in more detail as follows.

Figure 2:
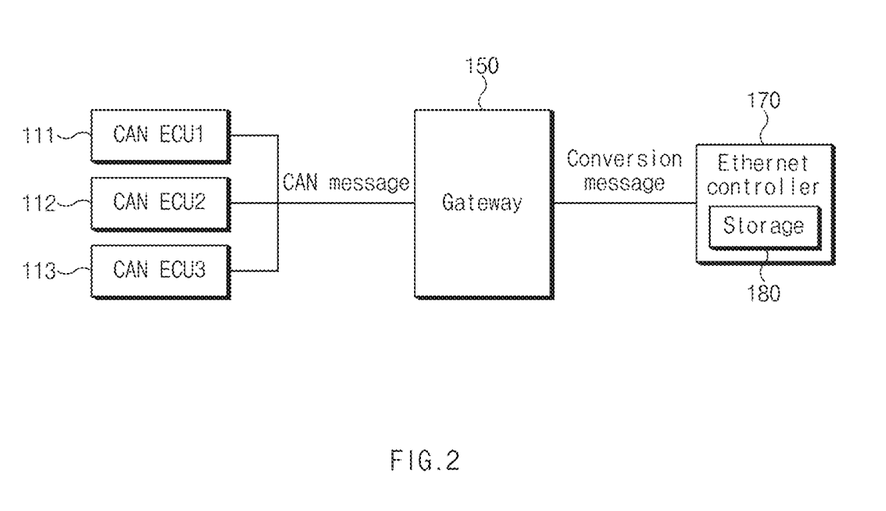
FIG. 2 is a diagram illustrating the configuration of a vehicle communication network system according to an embodiment of the present disclosure.

FIG. 2 is a diagram illustrating the configuration of a vehicle communication network system according to an embodiment of the present disclosure.

Referring to FIG. 2, a vehicle communication network system according to an embodiment of the present disclosure may include controller area network (CAN) controllers 111, 112, and 113, a gateway 150, and an Ethernet controller 170.

Each of the CAN controllers 111, 112, and 113 may be one ECU. For example, each of the CAN controllers 111, 112, and 113 may be one of an engine control device, an anti-lock braking system (ABS) brake control device, a light control device, an air conditioner control device, a power door lock control device, an automatic transmission control device, an active suspension control device, a power window control device, a power seat control device, an airbag control device, and a dashboard.

The CAN controllers 111, 112 and 113 may be connected based on CAN communication. The CAN communication may be a standard communication protocol designed for microcontrollers or devices to communicate with each other in a vehicle without a host.

The CAN communication may transmit a control signal to the CAN controllers 111, 112, and 113 through a communication line including a high line and a low line. The CAN communication may be classified into low-speed CAN communication and high-speed CAN communication according to a communication speed for transmitting and receiving control signals. The low-speed CAN communication may be CAN communication having a communication speed less than a reference speed, and the high-speed CAN communication may be CAN communication having a communication speed greater than or equal to the reference speed. The low-speed CAN communication may include multimedia controller area network (M-CAN) communication and body controller area network (B-CAN) communication for transmitting and receiving signals for operating various electronic devices.

The high-speed CAN communication may include powertrain CAN (P-CAN) communication for transmitting and receiving signals for controlling a power train, stability control (such as ABS, active suspension, and the like), and a shift function in real time, chassis controller area network (C-CAN) communication, and diagnosis CAN (D-CAN) communication for diagnosing an error.

A CAN message may include a header and a payload.

The standard of the CAN communication protocol may be classified according to an identifier (CAN message ID) included in the CAN message. Standard CAN may include an identifier of 11 bits, and extended CAN may include an identifier of 29 bits.

The gateway 150 may receive a CAN message and may generate a conversion message based on the received CAN message. The conversion message may be an Ethernet-based, i.e., a service-oriented middleware over IP (SOME/IP) communication protocol-based communication message. In addition, the gateway 150 may transmit the conversion message to the Ethernet controller 170.

The Ethernet controller 170 may perform a specific service based on the conversion message by using a service model stored in storage 180. The Ethernet controller 170 may be one of a vehicle terminal (AVN), a head unit, a camera, a cluster, a head-up display (HUD), and a driver assistance system (ADAS).

The storage 180 may be provided in the Ethernet controller 170 and may be a separate memory. Therefore, the storage 180 may include a non-volatile memory such as a hard disk drive, a flash memory, an electrically erasable programmable read-only memory (EEPROM), a static RAM (SRAM), a ferro-electric RAM (FRAM), a phase-change RAM (PRAM), and a magnetic RAM (MRAM), a volatile memory such as a dynamic random access memory (DRAM), a synchronous dynamic random access memory (SDRAM), and a double date rate-SDRAM (DDR-SDRAM), and/or a combination thereof.

The characteristics of a data routing method according to an embodiment of the present disclosure in which the gateway 150 generates a conversion message and transmits the message will be described briefly as follows.

Figure 3:
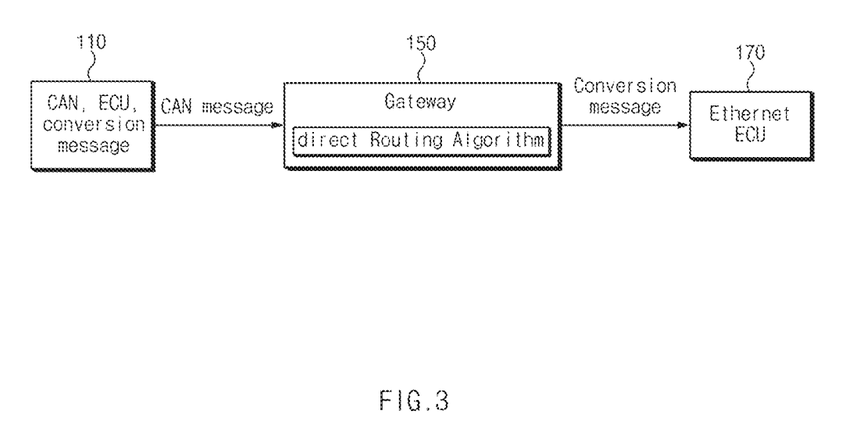
FIG. 3 is a diagram illustrating a data routing method of a gateway according to an embodiment of the present disclosure.
Figure 4:
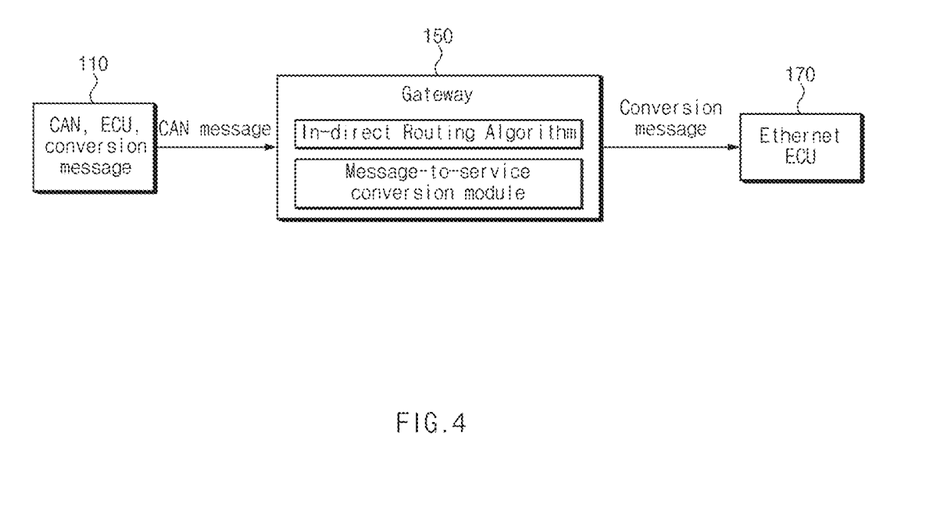
FIG. 4 is a diagram illustrating a data routing method of a gateway according to a comparative example.

FIG. 3 is a diagram illustrating a data routing method of a gateway according to an embodiment of the present disclosure. FIG. 4 is a diagram illustrating a data routing method of a gateway according to a comparative example.

Referring to FIG. 3, the gateway 150 according to an embodiment of the present disclosure may generate a conversion message without modifying or converting the payload of a CAN message. The gateway 150 according to an embodiment of the present disclosure may convert a CAN message into a SOME/IP message based on a direct routing algorithm scheme.

To the contrary, as in FIG. 4, a gateway according to a comparative example may convert the payload of a CAN message based on the in-direct routing algorithm. This is because the payload specification of the CAN message is different from the payload specification of the SOME/IP message. The data location of the payload of the CAN message is determined in advance in units of functions, whereas the data location of the SOME/IP message is not determined because the SOME/IP message is service-based. Therefore, as in the comparative example, the existing gateway required a process of changing the payload of the CAN message to it in the SOME/IP scheme. Therefore, the gateway according to the comparative example required a procedure for parsing the payload of the message signal-based CAN message to change to a service interface-based payload.

Because the embodiment of the present disclosure as shown in FIG. 3 generates a conversion message without changing the payload of the CAN message, it is possible to improve transmission time delay or gateway performance degradation in the data routing process.

Hereinafter, a data routing method based on a vehicle communication network system according to an embodiment of the present disclosure will be described in more detail as follows.

Figure 5:
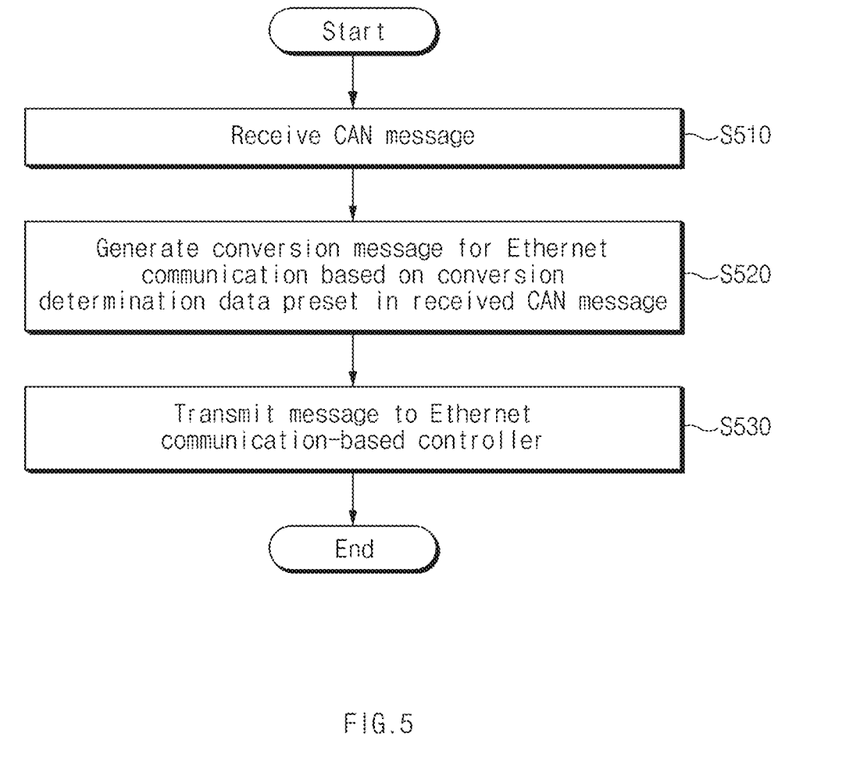
FIG. 5 is a flowchart illustrating a data routing method based on a vehicle communication network system according to an embodiment of the present disclosure.
Figure 6:
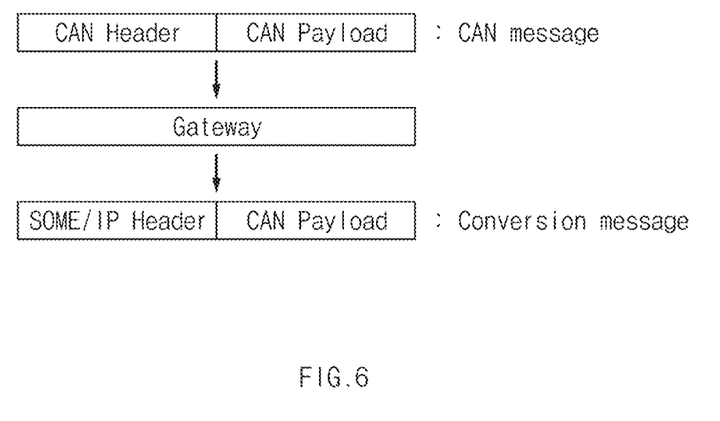
FIG. 6 is a schematic diagram illustrating a data routing method based on a vehicle communication network system according to an embodiment of the present disclosure.

FIG. 5 is a flowchart illustrating a data routing method based on a vehicle communication network system according to an embodiment of the present disclosure. FIG. 6 is a schematic diagram illustrating a data routing method based on a vehicle communication network system according to an embodiment of the present disclosure.

A data routing method based on a vehicle communication network system according to another embodiment of the present disclosure will be described with reference to FIGS. 5 and 6.

In S510, the gateway 150 may receive a CAN message.

The CAN message may be a message generated by one of the CAN controllers 111, 112 and 113. The CAN message may include a CAN header and a CAN payload as shown in FIG. 6.

In S520, the gateway 150 may generate a conversion message for Ethernet communication based on conversion determination data preset in the received CAN message.

The conversion determination data may be included in the header of the CAN message. According to an embodiment, the conversion determination data may be a message ID included in the header of the CAN message. To this end, a message ID of a message, which is required to be converted into a SOME/IP message among CAN messages, may be stored in a database in advance.

The gateway 150 may search the database, and when the message ID of the received CAN message is detected in the database, the gateway 150 may generate a conversion message.

The header structure of the conversion message has the standard of the SOME/IP communication protocol, and the payload may be composed of a CAN payload. In other words, because the gateway 150 according to an embodiment of the present disclosure does not modify the CAN payload in the process of generating the SOME/IP communication-based conversion message, the data routing speed may be increased.

In S530, the gateway 150 may transmit a message to the Ethernet controller 170.

The Ethernet controller 170 may check the received conversion message and may perform a specific service requested through the conversion message.

Figure 7:
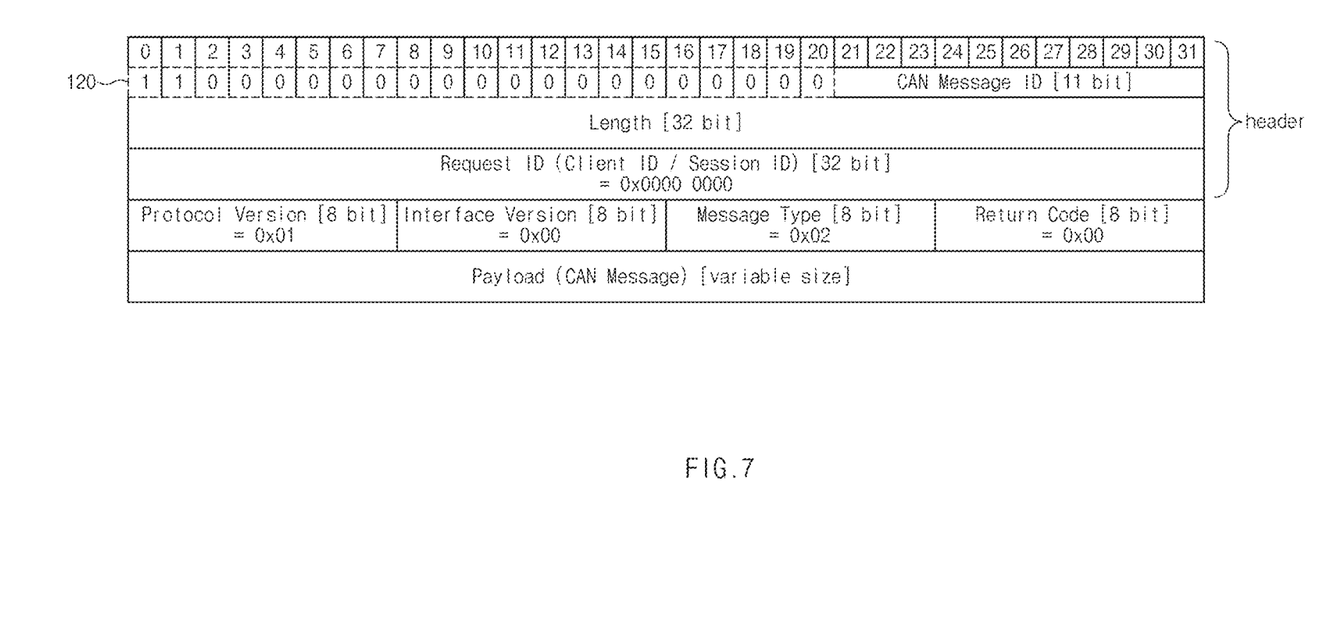
FIG. 7 is a diagram illustrating a conversion message according to an embodiment of the present disclosure.

FIG. 7 is a diagram illustrating a conversion message according to an embodiment of the present disclosure.

Referring to FIG. 7, a conversion message according to an embodiment of the present disclosure may include a header and a payload.

The header may include a conversion factor 120 and a CAN message ID.

The conversion factor 120 may be information indicating that a conversion message conforming to the regulation of the SOME/IP message protocol is generated based on the CAN message.

The CAN message ID may be an identifier of the CAN message, which identifies the content of the message and gives priority to the message. The length of the CAN message ID may vary according to standard CAN and extended CAN. That is, the standard CAN may have an 11-bit identifier, and the extended CAN may be distinguished by a 29-bit identifier.

In addition, the header may further include Length and Request ID. The Length means a payload length and may be 32 bits. The Request ID may include Client ID and Session ID and may be set to 32 bits. The Client ID may be a unique identifier for the calling client within the ECU. The Session ID may be an identifier for session processing.

Protocol Version may be information for distinguishing a protocol and may be set to 8 bits.

Interface Version may be information for distinguishing a major service interface version and may be set to 8 bits.

Message Type may be to distinguish a message type.

Return Code may be to distinguish a return code.

Payload may correspond to the payload of the CAN message received by the gateway 150. Because the payload of the conversion message according to an embodiment of the present disclosure does not convert the payload of the CAN message into the SOME/IP communication protocol standard, data routing speed may be increased compared to a comparative example.

Figure 8:
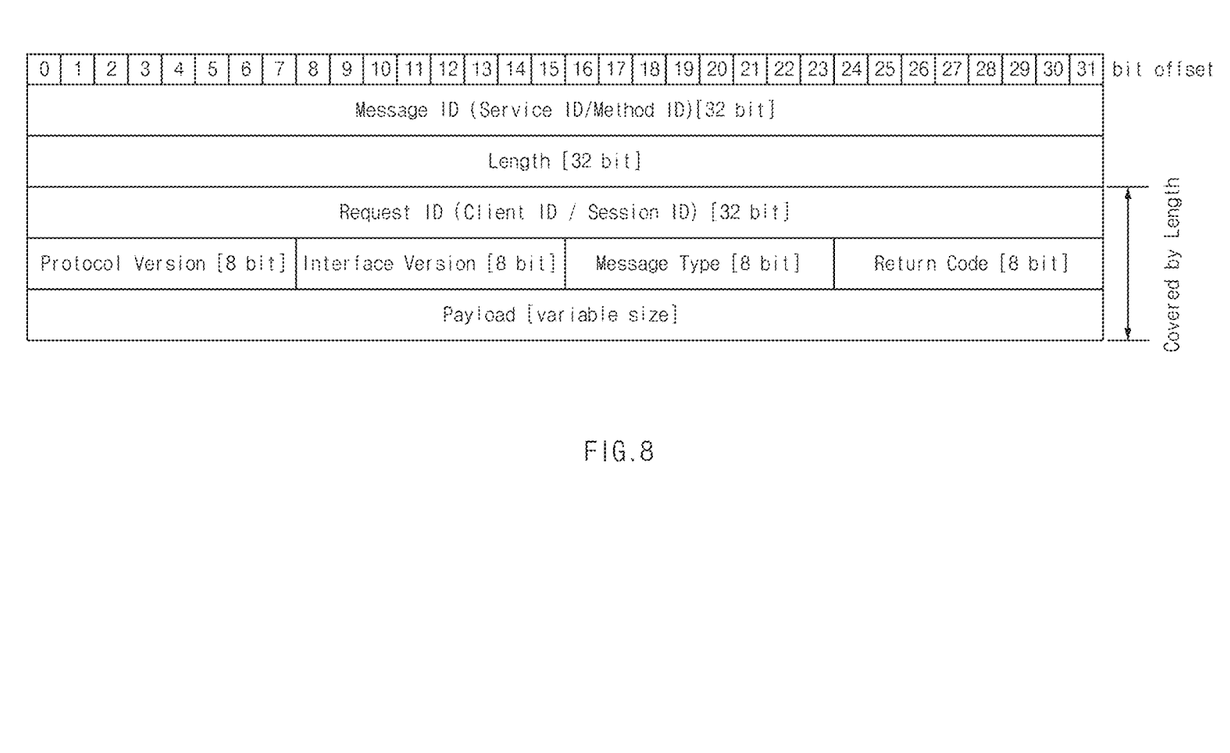
FIG. 8 is a diagram illustrating a structure of a service-oriented middleware over IP (SOME/IP) message according to a comparative example.

FIG. 8 is a diagram illustrating a structure of a SOME/IP message according to a comparative example. FIG. 8 may be a SOME/IP message obtained by converting a CAN message based on the scheme illustrated in FIG. 5.

Referring to FIG. 8, the header of the SOME/IP message according to the comparative example may include Message ID including Service ID and Method ID. The Service ID may mean a unique identifier of each service.

In addition, the header of the SOME/IP message according to the comparative example may further include Length and Request ID.

In addition, the SOME/IP message according to the comparative example may include Protocol Version for distinguishing a protocol, Interface Version for distinguishing a service interface version, Message Type for distinguishing a message type, and Return Code for distinguishing a return code.

The SOME/IP message according to a comparative example may include serialized data and may be converted based on the payload of the CAN message. According to a comparative example, because the payload of the CAN message is converted in the SOME/IP message protocol scheme, data routing may be delayed compared to the embodiment of the present disclosure shown in FIG. 7.

Figure 9:
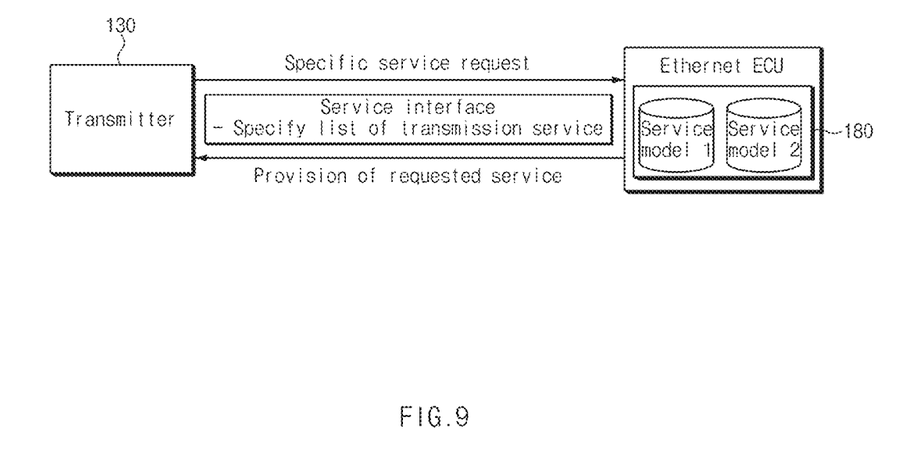
FIG. 9 is a diagram illustrating a procedure for performing a service function of an Ethernet controller according to an embodiment of the present disclosure.

FIG. 9 is a diagram illustrating a procedure for performing a service function of an Ethernet controller according to an embodiment of the present disclosure.

Referring to FIG. 9, the Ethernet controller 170 according to an embodiment of the present disclosure may confirm that a specific service is requested based on a message transmitted by a transmitter 130. The transmitter 130 may be a CAN controller or another Ethernet controller.

The Ethernet controller 170 may confirm the received message and operate a service model for performing a service requested through the received message.

The service model may include a first service model and a second service model.

The first service model may be an algorithm capable of performing a specific service based on a CAN message-based payload based. The first service model may perform a specific service based on the conversion message generated by the gateway 150 according to the embodiment of the present disclosure shown in FIG. 7.

According to an embodiment, the Ethernet controller 170 may select the first service model of the storage 180 based on the confirmation of the conversion factor 120.

The second service model may perform a specific service based on the payload based on the SOME/IP message. The second service model may perform a specific service based on a payload in a service-based message other than the conversion message converted by the gateway 150.

The Ethernet controller 170 according to an embodiment of the present disclosure may perform the service requested by the transmitter 130 regardless of the payload type of the message by using the first service model and the second service model. In particular, the Ethernet controller 170 according to an embodiment of the present disclosure may perform a specific service based on the SOME/IP message including the CAN message-based payload generated by the gateway 150 by using the first service model.

Hereinafter, a method of receiving a message from the gateway 150 by a plurality of Ethernet controllers will be described as follows.

Figure 10:
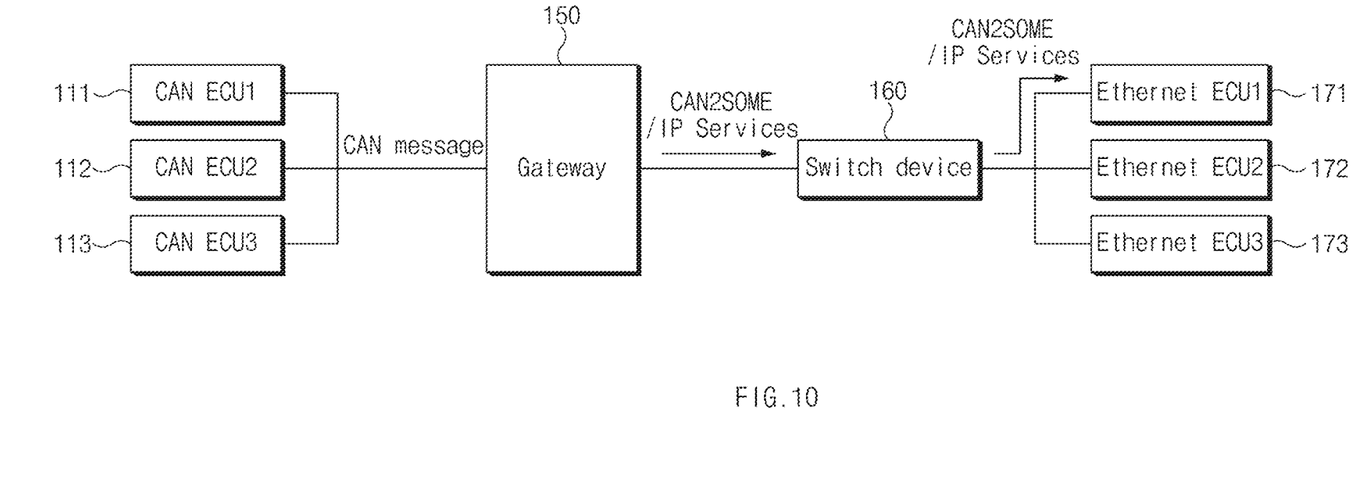
FIG. 10 is a diagram illustrating a method of receiving a message by a plurality of Ethernet controllers according to an embodiment of the present disclosure.

FIG. 10 is a diagram illustrating a method of receiving a message by a plurality of Ethernet controllers according to an embodiment of the present disclosure.

Referring to FIG. 10, in order to transmit a plurality of conversion messages, the gateway 150 may receive a plurality of CAN messages and generate a conversion message according to the SOME/IP communication protocol regulation based on the plurality of CAN messages received. The gateway 150 may transmit the destination address to a switch device 160 together with the conversion message. The destination address may be one piece of IP information of first to third Ethernet controllers 171 to 173. FIG. 9 illustrates an example in which the destination address of a plurality of conversion messages is IP information of the first Ethernet controller 171.

The switch device 160 may retain the IP information of the first to third Ethernet controllers 171 to 173. The switch device 160 may generate a route based on the message and the destination address corresponding to the IP information and may transmit the received conversion message according to the generated route.

The first Ethernet controller 171 may subscribe to a destination address for performing a service based on a message transmitted by the CAN controller and may receive a plurality of conversion messages. In addition, the first Ethernet controller 171 may select only a necessary message from among a plurality of conversion messages and transmit the necessary message to an application.

As in FIG. 10, the gateway 150 may transmit conversion messages to Ethernet controllers in a broadcast scheme.

Figure 11:
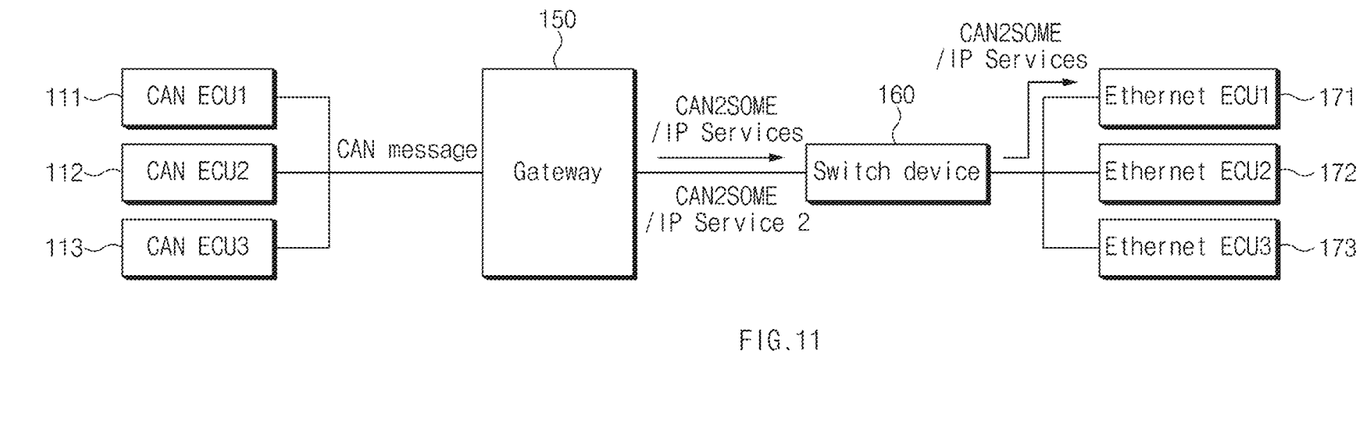
FIG. 11 is a diagram illustrating a method of receiving a message by a plurality of Ethernet controllers according to another embodiment of the present disclosure.

FIG. 11 is a diagram illustrating a method of receiving a message by a plurality of Ethernet controllers according to another embodiment of the present disclosure.

Referring to FIG. 11, in order to transmit a plurality of conversion messages, the gateway 150 may receive a plurality of CAN messages and generate a conversion message according to the SOME/IP communication protocol regulation based on the plurality of CAN messages received. The gateway 150 may transmit the destination address to the switch device 160 together with the conversion message. The destination address may be one piece of IP information of the first to third Ethernet controllers 171 to 173. According to an embodiment, the gateway 150 may divide the plurality of conversion messages into two or more groups, and may assign different destination addresses to the groups, respectively. According to an embodiment, the first group of conversion messages may have a destination address of the first Ethernet controller 170. The number of groups into which the conversion messages are divided and a destination address for each group may be set in advance. The set number of groups and destination addresses may be stored in a database.

The switch device 160 may retain the IP information of the first to third Ethernet controllers 171 to 173. The switch device 160 may generate a route based on the message and the destination address and transmit the received conversion message according to the generated route.

The first Ethernet controller 171 may receive a first group of conversion messages transmitted by the CAN controller. In addition, the first Ethernet controller 171 may select only a necessary message from among a plurality of conversion messages and may transmit the necessary message to an application.

As in FIG. 11, the gateway 150 may transmit conversion messages to the Ethernet controllers in a multicast scheme.

Figure 12:
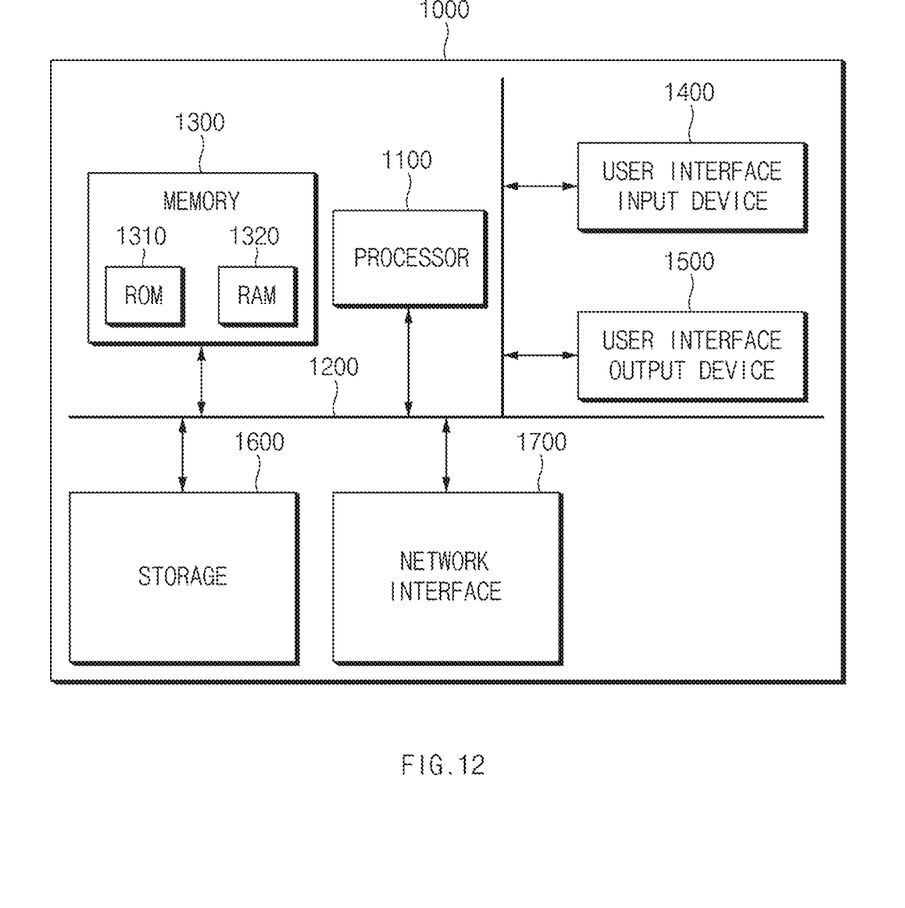
FIG. 12 is a diagram illustrating a computing system according to an embodiment of the present disclosure.

FIG. 12 illustrates a computing system according to an embodiment of the present disclosure.

Referring to FIG. 12, a computing system 1000 may include at least one processor 1100, a memory 1300, a user interface input device 1400, a user interface output device 1500, storage 1600, and a network interface 1700 connected through a bus 1200.

The processor 1100 may be a central processing device (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Accordingly, the processes of the method or algorithm described in relation to the embodiments of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, a detachable disk, or a CD-ROM.

The storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

According to the embodiments of the present disclosure, because the conversion message is generated without changing the payload of the CAN message, it is possible to improve transmission time delay or degradation of gateway performance in the data routing process.

According to the embodiments of the present disclosure, because it is not necessary to change the payload of the CAN message in the process of transmitting the CAN message to the Ethernet controller, an additional algorithm for changing the data of the payload into a service message may not be required.

In addition, various effects that should be directly or indirectly understood through the present disclosure may be provided.

Although embodiments of the present disclosure have been described for illustrative purposes, those having ordinary skill in the art should appreciate that various modifications, additions, and substitutions are possible, without departing from the scope and spirit of the disclosure.

Therefore, the embodiments disclosed in the present disclosure are provided for the sake of descriptions, not limiting the technical concepts of the present disclosure. Thus, it should be understood that such embodiments are not intended to limit the scope of the technical concepts of the present disclosure. The protection scope of the present disclosure should be understood by the claims below, and all the technical concepts within the equivalent scopes should be interpreted to be within the scope of the right of the present disclosure.

What is claimed is:

1. A communication network system comprising:
   a controller area network (CAN) controller configured to generate a CAN message;
   a gateway configured to receive the CAN message, and generate a conversion message for Ethernet communication based on that preset conversion determination data is included in the CAN message; and
   an Ethernet controller configured to receive the conversion message,
   wherein the gateway is further configured to
      generate the conversion message including a header having a preset conversion factor and an identifier (ID) of the CAN message based on a service-oriented middleware over IP (SOME/IP) communication protocol standard, and
      set a length of the conversion factor to a length obtained by subtracting a length of the ID of the CAN message from a length of the header of the SOME/IP communication protocol.

2. The communication network system of claim 1, further comprising:
   a database configured to store the conversion determination data for a message required to be transmitted to the Ethernet controller.

3. The communication network system of claim 2, wherein the gateway is configured to search whether the ID of the CAN message matches the conversion determination data stored in the database.

4. The communication network system of claim 1, wherein the gateway includes the conversion factor and the ID of the CAN message in the header by replacing Service-ID and Method-ID of the SOME/IP communication protocol.

5. The communication network system of claim 1, wherein the gateway is configured to replace a payload of the conversion message with a payload of the CAN message.

6. The communication network system of claim 1, wherein the Ethernet controller configured to:
   check a conversion factor indicating that the conversion message is converted from the CAN message; and
   operate a service model capable of performing a specific service based on a payload of the CAN message when the conversion factor is included in the conversion message.

7. The communication network system of claim 1, wherein corresponding to a plurality of Ethernet controllers, further comprising:
   a switch device configured to
   receive the conversion message from the gateway, and
   set a transmission route of the conversion message according to a destination of the conversion message.

8. The communication network system of claim 7, wherein the switch device is configured to:
   classify a plurality of conversion messages into two or more preset groups; and
   set the transmission route of the conversion message based on different destination addresses assigned to the converted message groups.

9. A method of operating a communication network system, the method comprising:
   receiving, by a gateway, a controller area network (CAN) message from a CAN controller;
   generating, by a gateway, a conversion message for Ethernet communication based on that preset conversion determination data is included in the CAN message; and
   transmitting, by a gateway, the conversion message to an Ethernet controller,
   wherein the generating of the conversion message further includes
      generating a header including a preset conversion factor and an identifier (ID) of the CAN message based on a service-oriented middleware over IP (SOME/IP) communication protocol standard, and
      using the conversion factor set to a length obtained by subtracting an ID length of the CAN message from a header length of the SOME/IP communication protocol.

10. The method of claim 9, wherein the generating of the conversion message includes:
    determining whether the ID of the CAN message corresponds to the preset conversion determination data.

11. The method of claim 9, wherein the generating of the conversion message includes:
    allowing the conversion factor and the ID of the CAN message to be included in the header by replacing Service-ID and Method-ID of the SOME/IP communication protocol.

12. The method of claim 9, wherein the generating of the conversion message includes:
    replacing a payload of the conversion message with a payload of the CAN message.

13. The method of claim 9, further comprising:
    performing, by the Ethernet controller, a specific service requested by the CAN message based on the conversion message.

14. The method of claim 13, wherein the performing of the specific service includes:
   checking, by the Ethernet controller, a conversion factor indicating that the conversion message is converted from the CAN message; and
   operating a service model capable of performing a specific service based on a payload of the CAN message based on the conversion factor included in the conversion message.

* * * * *